United States Patent
Jung

(10) Patent No.: US 7,443,450 B2
(45) Date of Patent: Oct. 28, 2008

(54) SYNC PROCESSOR OF FLAT PANEL DISPLAY FOR DETERMINING SIGNAL SAFETY ON THE BASIS OF HSYNC/VSYNC SIGNAL GENERATED ACCORDING TO DATA ENABLE SIGNAL

(75) Inventor: Yong-joon Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 574 days.

(21) Appl. No.: 11/243,222

(22) Filed: Oct. 4, 2005

(65) Prior Publication Data
US 2007/0200836 A1 Aug. 30, 2007

(30) Foreign Application Priority Data
Oct. 5, 2004 (KR) .................. 10-2004-0079205

(51) Int. Cl.
*H04N 5/06* (2006.01)
*H04N 5/04* (2006.01)
(52) U.S. Cl. .................. 348/540; 348/547; 348/521
(58) Field of Classification Search .......... 348/540, 348/500, 521, 530, 547; 375/354, 355, 362, 375/364; *H04N 5/04, 9/44, 5/06, 9/45, 9/455, H04N 5/10*
See application file for complete search history.

(56) References Cited
U.S. PATENT DOCUMENTS
5,351,093 A * 9/1994 Brown et al. ............ 348/530
5,896,180 A * 4/1999 Usui ..................... 348/547
6,831,634 B1 * 12/2004 Shigeta ................. 348/540

FOREIGN PATENT DOCUMENTS
| JP | 10-148812 | 6/1998 |
|---|---|---|
| JP | 11-003070 | 1/1999 |
| JP | 2001-154628 | 6/2001 |
| JP | 2002-027345 | 1/2002 |
| KR | 1999-0076135 | 10/1999 |

* cited by examiner

*Primary Examiner*—Sherrie Hsia
(74) *Attorney, Agent, or Firm*—Mills & Onello LLP

(57) ABSTRACT

In a sync processor for determining safety of signals on the basis of a horizontal/vertical sync signal generated according to a data enable signal, the sync processor includes a digital horizontal/vertical signal generator, a selector, a digital horizontal/vertical signal detector, a horizontal/vertical polarity determination unit, and a horizontal/vertical frequency determination unit. The digital horizontal/vertical signal generator generates a digital horizontal/vertical sync signal from the data enable signal. The digital horizontal/vertical signal detector detects a signal received from the selector and generates a digital horizontal/vertical signal. The horizontal/vertical polarity determination unit counts the number of low and high durations of a horizontal/vertical sync signal and generates a horizontal/vertical polarity signal in response. The horizontal/vertical frequency determination unit counts the number of cycles of the clock signal occurring in low and high durations of a digital horizontal/vertical polarity signal and generates a horizontal/vertical frequency signal in response.

9 Claims, 3 Drawing Sheets

SYNC PROCESSOR OF FLAT PANEL DISPLAY FOR DETERMINING SIGNAL SAFETY ON THE BASIS OF HSYNC/VSYNC SIGNAL GENERATED ACCORDING TO DATA ENABLE SIGNAL

BACKGROUND OF THE INVENTION

This application claims the priority of Korean Patent Application No. 2004-79205, filed on Oct. 5, 2004, in the Korean Intellectual Property Office, the disclosure of which is incorporated herein in its entirety by reference.

1. Field of the Invention

The present invention relates to a flat panel display (FPD) device, and more particularly, to a sync processor that determines signal safety on the basis of a horizontal/vertical synchronization signal generated in response to a data enable signal.

2. Description of the Related Art

FIG. 1 shows a data display area of a conventional LCD panel. Referring to FIG. 1, 1024 data lines and 768 gate lines are arranged, wherein the 1024 data lines are controlled by a horizontal synchronization signal (HSYNC) and the 768 gate lines are controlled by a vertical synchronization signal (VSYNC).

FIG. 2 shows waveforms appearing during a horizontal scanning period of an image signal. Referring to FIG. 2, a horizontal scanning period includes a pulse width period Thp, a back porch period Thb, a horizontal active period Thd, and a front porch period Thf of a horizontal sync signal HSYNC. The horizontal active period Thd is a period in which an actual image is displayed in row directions of a screen. The back porch period Thb and the front porch period Thf are periods in which optically blank areas are displayed at the left and right ends of a screen. During the horizontal active period Thd, 1024 data elements are sequentially supplied to the screen and a data enable signal DE is activated.

FIG. 3 shows waveforms appearing during a vertical scanning period of an image signal. Referring to FIG. 3, a vertical scanning period includes a pulse width period Tvp, a back porch period Tvb, a vertical active period Tvd, and a front porch period Tvf of a vertical sync signal VSYNC. The vertical active period Tvd is a period in which an image is actually displayed in column directions of a screen, and the back porch period Tvb and the front porch period Tvf are periods in which optically blank areas are displayed in the top and bottom ends of the screen. During the vertical active period Tvd, 768 elements data are sequentially supplied to the screen and a data enable signal DE is activated.

Meanwhile, since a LCD panel includes both a digital interface and an analog interface, the LCD panel needs to determine whether a received signal is an analog signal or a digital signal. A sync processor of a flat panel display (FPD) determines a mode and safety of an input signal on the basis of a horizontal sync signal HSYNC and a vertical sync signal VSYNC, where the horizontal sync signal HSYNC and the vertical sync signal VSYNC are analog signals or digital signals. The sync processor provides an interrupt signal to a micro-controller unit (MCU) whenever a source, a frequency, or a polarity of an input signal is changed, thereby indicating that the input signal is unstable. The MCU changes a LCD panel 400 from a mute state to a normal display state if no interrupt signal is generated within a predetermined time period.

The sync processor determines a mode and safety of an input signal using a horizontal sync signal HSYNC and a vertical sync signal VSYNC output from a receiving terminal Rx of a DVI (Digital Video Interface) or using a data enable signal DE. However, when the horizontal sync signal HSYNC and the vertical sync signal VSYNC are used, if an input signal, which is defined in a separate sync mode based on a DVI standard, is not output in the separate sync mode from a graphic card, it is impossible to determine the mode of the input signal. Also, since the horizontal sync signal HSYNC and the vertical sync signal VSYNC are commonly transmitted through a B channel of R/G/B data channels to a transmitting terminal Tx of the DVI, when a DVI clock signal and the B channel are stable and the R/G channels are unstable, the MCU determines that DVI inputs are stable so that, in this case, abnormal images are still displayed.

Also, when signal safety is determined on the basis of the data enable signal DE, an analog sync processing circuit must be separately constructed.

To solve these problems, the fact that a data enable signal DE of a DVI is transmitted through three R/G/B channels is advantageously used. That is, since a horizontal sync signal HSYNC and a vertical sync signal VSYNC generated according to the data enable signal DE become unstable when at least one of the three R/G/B channels is unstable, it is possible to easily determine signal safety.

SUMMARY OF THE INVENTION

The present invention provides a sync processor that determines signal safety on the basis of a horizontal/vertical sync signal generated according to a data enable signal.

In one aspect of the present invention, there is provided a sync processor of a flat panel display (FPD) device, comprising: a digital horizontal/vertical signal generator that generates a digital horizontal/vertical sync signal in response to a data enable signal; a first selector that selects the digital horizontal/vertical sync signal or a horizontal/vertical sync signal received from a digital video interface (DVI), in response to a first selection signal; a digital horizontal/vertical signal detector that detects a signal transmitted by the first selector and that generates a digital horizontal/vertical signal; a horizontal/vertical polarity determination unit that receives the horizontal/vertical sync signal, that counts a number of cycles of low duration of the horizontal/vertical sync signal and a number of cycles of high duration of the horizontal/vertical sync signal, and that generates a horizontal/vertical polarity signal in response; and a horizontal/vertical frequency determination unit that receives the digital horizontal/vertical signal, that counts a number of cycles of a clock signal occurring in low durations of the digital horizontal/vertical signal and a number of cycles of the clock signal occurring in high durations of the digital horizontal/vertical signal, and that generates a horizontal/vertical frequency signal in response.

In one embodiment, the sync processor further comprises an analog horizontal/vertical signal detector that receives an analog vertical sync signal and an analog horizontal sync signal and that generates an analog horizontal/vertical signal.

In another embodiment, the horizontal/vertical polarity determination unit counts the number of low durations of the analog horizontal/vertical signal and the number of high durations of the analog horizontal/vertical signal, and generates the horizontal/vertical polarity signal in response.

In another embodiment, the horizontal/vertical polarity determination unit generates a horizontal/vertical polarity signal with a low or high polarity corresponding to the smaller one among the number of the low durations of the digital horizontal/vertical signal or the analog horizontal/vertical signal and the number of the high durations of the digital horizontal/vertical signal or the analog horizontal/vertical signal.

In another embodiment, the sync processor further comprises a second selector that selects the digital horizontal/vertical signal or the analog horizontal/vertical signal in response to a second control signal and that transmits the selected signal to the horizontal/vertical frequency determination unit.

In another embodiment, the horizontal/vertical frequency determination unit counts a number of low durations of the analog horizontal/vertical signal and a number of high durations of the analog horizontal/vertical signal and generates the counted value as the horizontal/vertical frequency signal.

In another embodiment, the first and second selection signals are provided from a microprocessor that determines whether the analog horizontal/vertical sync signal or the horizontal/vertical sync signal received from the DVI exists.

In another aspect, the present invention is directed to a sync processor of a flat panel display (FPD) device, comprising: an analog horizontal/vertical signal detector that receives an analog vertical sync signal and an analog horizontal sync signal and generates an analog horizontal/vertical signal; a digital horizontal/vertical signal generator generating a digital horizontal/vertical sync signal in response to a data enable signal; a first selector that selects the digital horizontal/vertical sync signal or a horizontal/vertical sync signal received from a digital video interface (DVI), in response to a first selection signal; a digital horizontal/vertical signal detector that detects a signal received from the first selector and that generates a digital horizontal/vertical signal in response; a horizontal/vertical polarity determination unit that counts a number of low durations of the analog horizontal/vertical signal or the horizontal/vertical sync signal and a number of high durations of the analog horizontal/vertical signal or the horizontal/vertical sync signal, and that generates a horizontal/vertical polarity signal in response; a second selector selecting the digital horizontal/vertical signal or the analog horizontal/vertical signal in response to a second control signal and transmits the selected signal to the horizontal/vertical frequency determination unit; and a horizontal/vertical frequency determination unit that counts a number of cycles of the clock signal occurring in low and high durations of a signal transmitted by the second selector and that generates a horizontal/vertical frequency signal in response.

In one embodiment, the first and second selection signals are provided by a microprocessor that determines whether the analog horizontal/vertical sync signal or the horizontal/vertical sync signal received from the DVI exists.

According to the present invention, even in the case where no horizontal sync signal and no vertical sync signal are input, it is possible to readily and reliably determine the safety of input signals, since the safety of input signals is determined on the basis of a digital horizontal/vertical sync signal generated according to a data enable signal DE transmitted through all three RGB channels. Also, according to the present invention, a sync processor can use both an analog interface and a digital interface without the need for a separate analog sync processor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the appended drawings. Like reference numbers refer to like components throughout the drawings.

Figure 4:
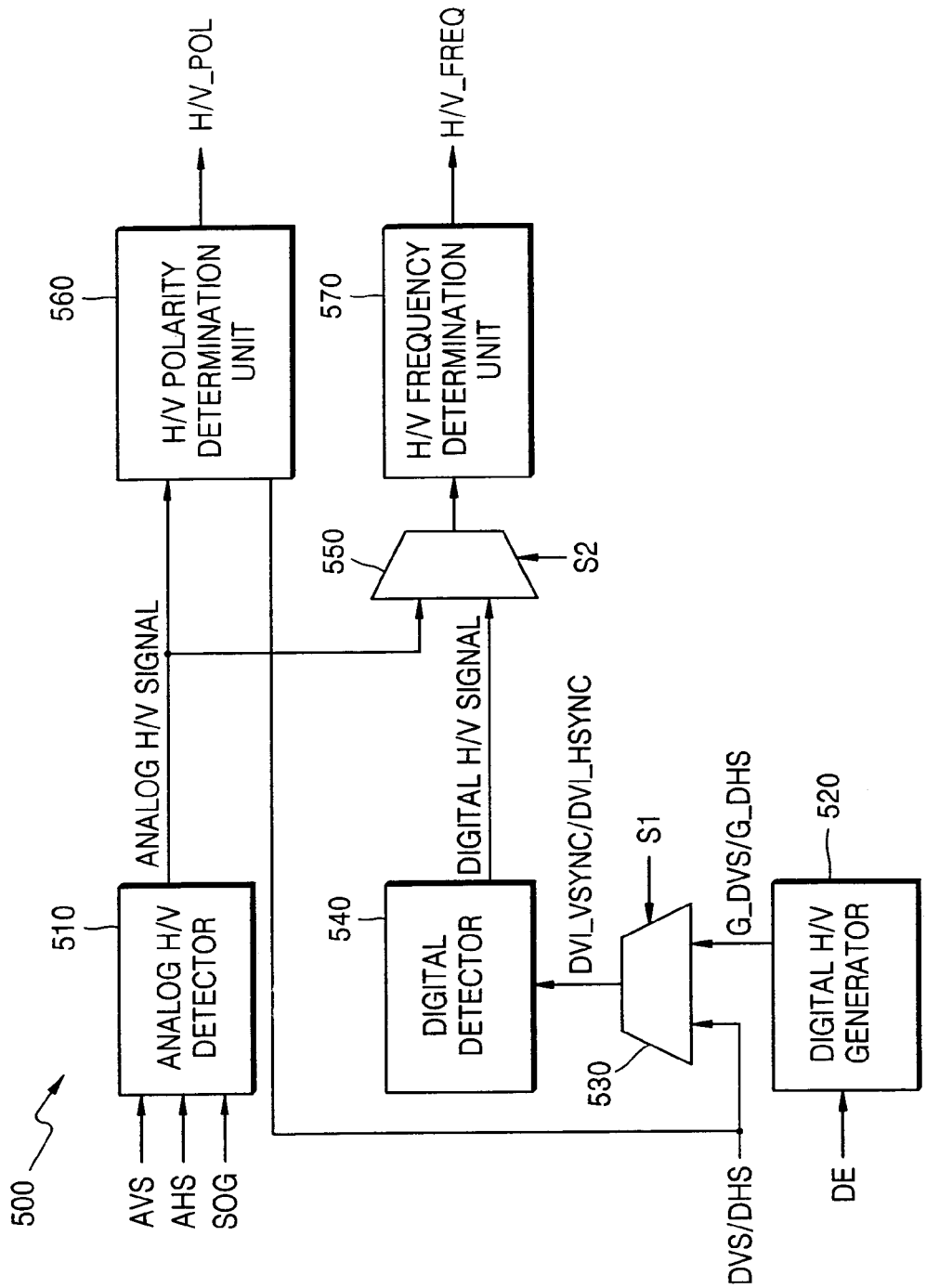
FIG. 4 is a block diagram of a sync processor according to an embodiment of the present invention.

FIG. 4 is a block diagram of a sync processor 500 according to an embodiment of the present invention. Referring to FIG. 4, the sync processor 500 outputs an interrupt signal to a MCU (not shown) whenever a source, a frequency, or a polarity of an input signal is changed, thereby indicating that the input signal is in a unstable state.

The sync processor 500 includes an analog H/V detector 510, a digital H/V generator 520, a first selector 530, a digital H/V detector 540, a second selector 550, a H/V polarity determination unit 560, and a H/V frequency determination unit 570.

The analog H/V detector 510 detects an analog vertical sync signal AVS, an analog horizontal sync signal AHS, and a SOG (Sync-On-Green) signal, and then generates an analog H/V signal. The SOG signal represents a mode in which a horizontal sync signal and a vertical sync signal are transmitted via a green data line.

Figure 1:
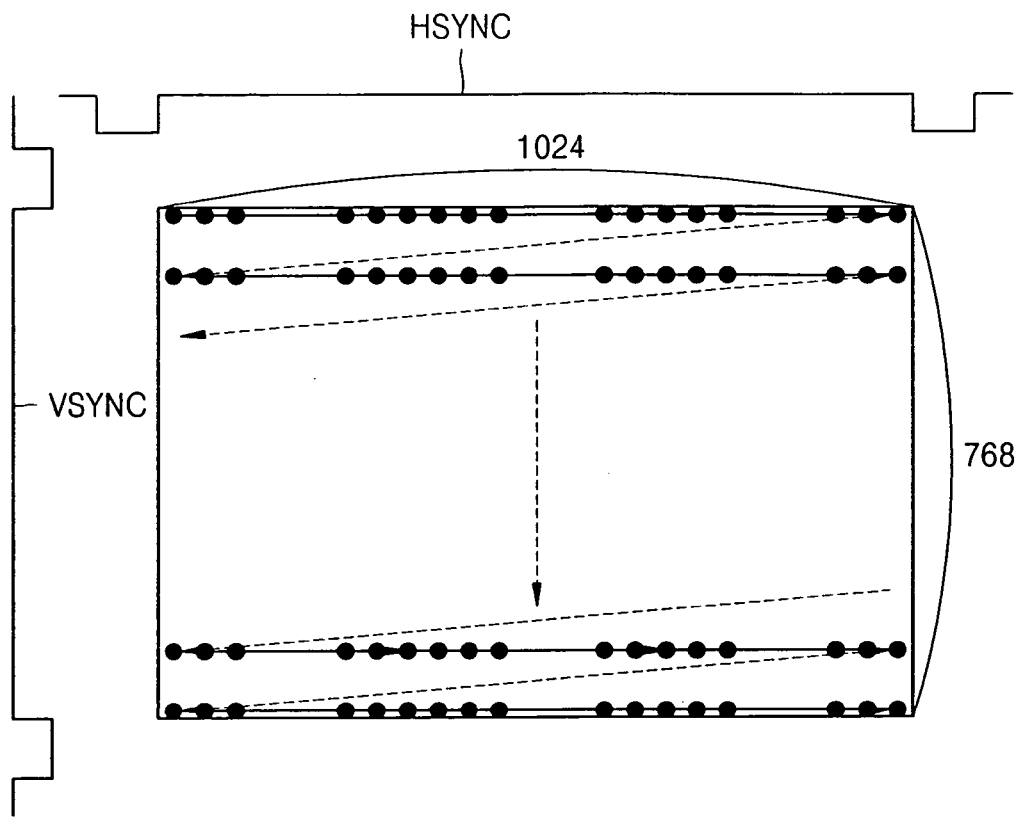
FIG. 1 illustrates a data display area of a LCD panel.
Figure 2:
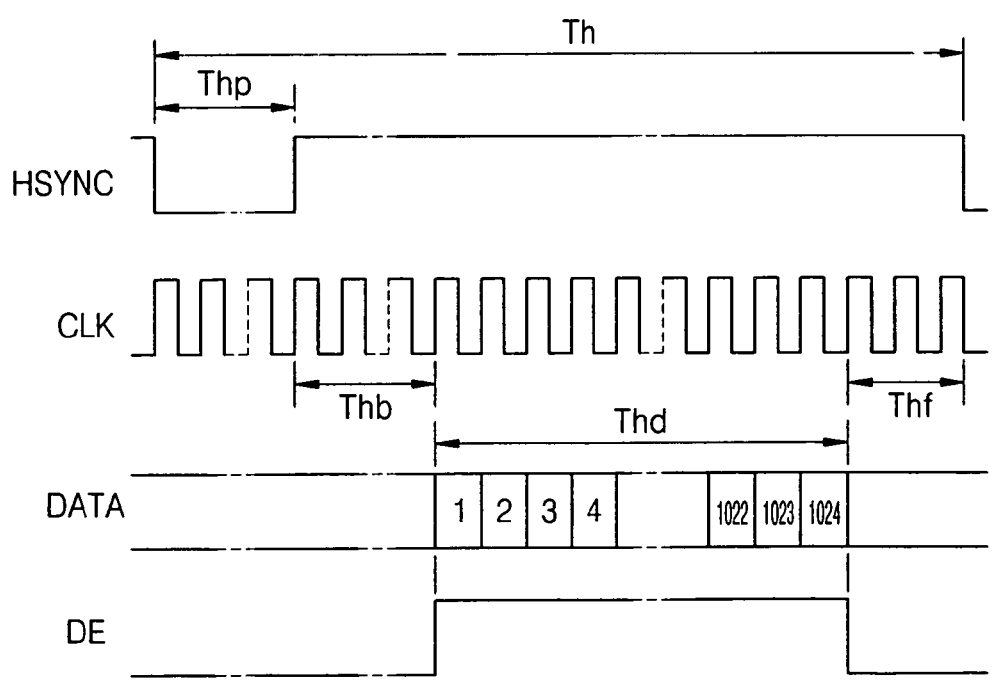
FIG. 2 is a waveform diagram of signals during a horizontal scanning period of an image signal.

The digital H/V generator 520 receives a data enable signal DE and generates a digital vertical sync signal G_DVS and a digital horizontal sync signal G_DHS. In order to generate the digital horizontal sync signal G_DHS, the digital H/V generator 520 counts the number of clock cycles CLK during a horizontal scanning period (that is, Th=Thp+Thb+Thd+Thf) described above with reference to FIG. 2 and sets the counted value as a first horizontal count value HTOTAL. The digital H/V generator 520 generates a horizontal sync generation count value HS_GEN_count by counting the first horizontal count value HTOTAL from a falling edge of the data enable signal DE. If the horizontal sync generation count value HS_GEN_count is larger than a count of Thf and smaller than a count of Thf+Thp, the digital horizontal sync signal G_DHS becomes logic low. Otherwise, the digital horizontal sync signal G_DHS becomes logic high.

Figure 3:
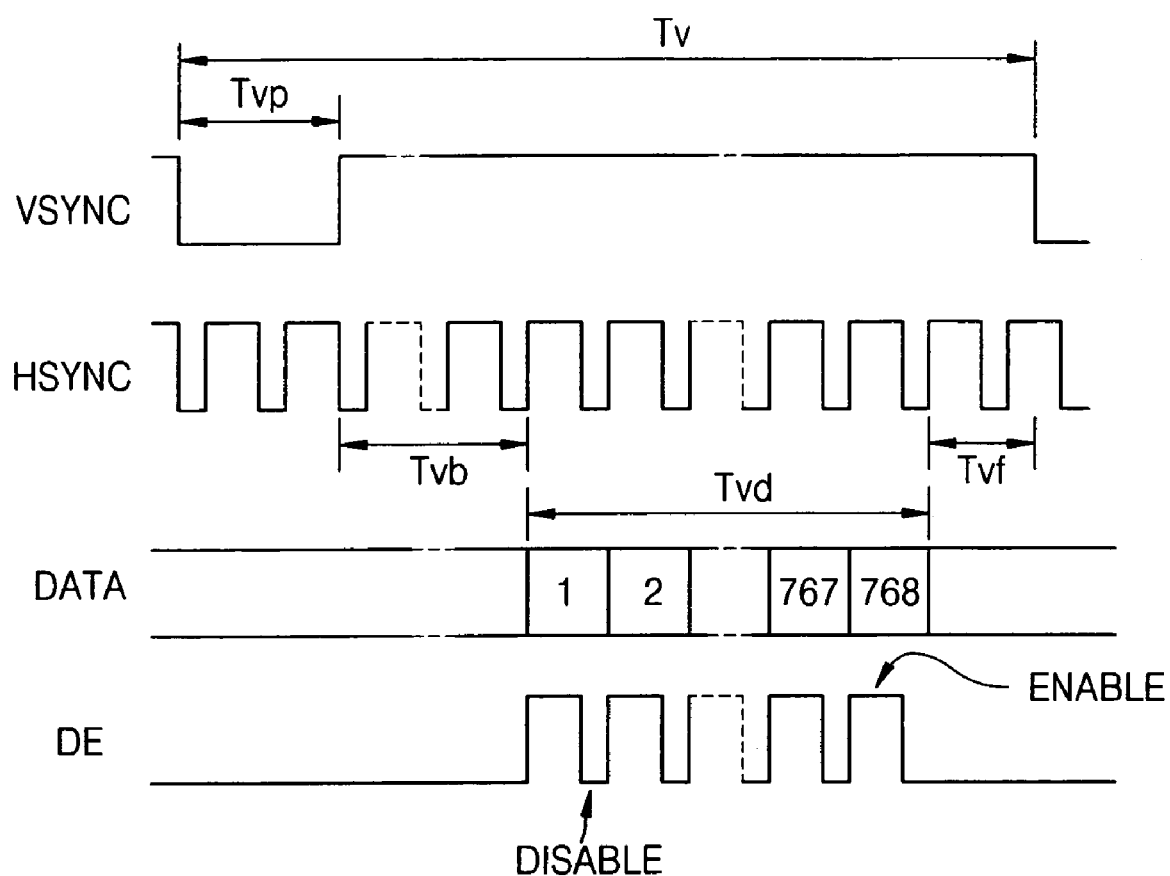
FIG. 3 is a waveform diagram of signals during a vertical scanning period of an image signal.

Also, in order to generate the digital vertical sync signal G_DVS, the digital H/V generator 520 generates a preliminary vertical sync signal VS_pre having a low level, from a falling edge of the data enable signal DE to a following rising edge of the data enable signal DE during a vertical scanning period described above with reference to FIG. 3. While the preliminary vertical sync signal VS_pre is low, the number of cycles of the digital sync signal G_DHS is counted. If the counted value is larger than a count of Tvf and smaller than a count of Tvf+Tvp, the digital vertical sync signal G_DVS becomes low. Otherwise, the digital vertical sync signal G_DVS becomes high.

The first selector 530 selects one of a digital vertical sync signal DVS and a digital horizontal sync signal DHS generated by a digital video interface (DVI), and one of a digital vertical sync signal G_DVS and a digital horizontal sync signal G_DHS generated by the digital H/V generator 520, in response to a first selection signal S1, and provides the selected signals as a DVI vertical sync signal DVI_VSYNC and a DIV horizontal sync signal DVI_SYNC, respectively, to the digital H/V detector 540. The first selection signal S1 and a second selection signal S2 as will be described later are control signals that are generated by the MCU to determine whether an input signal is an analog signal or a digital signal.

The digital H/V detector 540 detects the DVI vertical sync signal DVI_VSYNC and the DVI horizontal sync signal DVI-_SYNC and generates a digital H/V signal in response.

The second selector 550 selects an analog H/V signal generated by the analog H/V detector 510 or a digital H/V signal generated by the digital H/V detector 540 in response to a second selection signal S2 and transfers the selected signal to the H/V frequency determination unit 570.

The H/V polarity determination unit 560 receives the analog H/V signal generated by the analog H/V detector 510 and the digital vertical sync signal DVS and the digital horizontal sync signal DHS input from an external source, and generates a horizontal/vertical polarity signal H/V_POL. The H/V polarity determination unit 560 counts the number of cycles of a clock signal occurring in low and high durations of the analog H/V signal, the digital vertical sync signal DHS, or the digital vertical sync signal DVS, and generates a horizontal/vertical polarity signal H/V_POL with a low (or high) polarity corresponding to the smaller count value.

The H/V frequency determination unit 570 receives the analog H/V signal or the digital H/V signal from the second selection unit 550 and generates a horizontal/vertical frequency signal H/V_FREQ. The H/V frequency determination unit 570 counts the number of cycles of a clock signal occurring in low and high durations of the analog H/V signal or the digital H/V signal. If the counted value is different than a previous value, the H/V frequency determination unit 570 determines that a frequency of a corresponding signal is changed, thus generating a horizontal/vertical frequency signal H/V_FREQ. The horizontal/vertical frequency signal H/V_FREQ is provided to the MCU, thereby making the screen mute.

The sync processor 500 determines a source of an input signal using the following process. If one of a digital vertical sync signal G_DVS and a digital horizontal sync signal G_DHS generated by the digital H/V generator 520 is selected in response to a first selection signal S1 and the selected signal is input to the digital H/V detector 540, the digital H/V detector 540 determines whether a DVI vertical sync signal DVI_VSYNC and a DVI horizontal sync signal DVI_HSYNC exist. The DVI vertical sync signal DVI_VSYNC and the DVI horizontal sync signal DVI_H-SYNC are generated in response to a data enable signal DE that is provided through three R/G/B channels, and no data enable signal DE is provided if at least one of the three R/G/B channels is open. Accordingly, if no data enable signal DE is provided, no digital vertical sync signal G_DVS and digital horizontal sync signal G_DHS are generated by the digital H/V generator, and thus a DVI mode is not selected.

Meanwhile, there are cases where the state of a cable is poor or the data enable signal DE is inadequate due to failure of an input signal, even if a DVI mode is detected. In these cases, the digital vertical sync signal G_DVS and the digital horizontal sync signal G_DHS are randomly generated. Thus, the frequency of a digital H/V signal output from the digital H/V detector 540 is changed. The digital H/V signal is selected in response to the second selection signal S2 and provided to the H/V frequency determination unit 570. Then, a horizontal/vertical frequency signal H/V_FREQ generated by the H/V frequency determination unit 570 operates as an interrupt signal of the MCU.

A horizontal/vertical polarity signal H/V_POL of the sync processor 500 is generated according to the respective polarities of the digital vertical sync signal DVS and the digital horizontal sync signal DHS directly received from the DVI or according to the polarity of an analog H/V signal.

Therefore, according to the present invention, since a sync processor of a flat panel display (FPD) device determines the validity of input signals on the basis of a digital horizontal/vertical sync signal generated in response to a data enable signal DE transmitted through three RGB channels even if no horizontal sync signal and vertical sync signal are input, it is possible to easily determine safety of input signals. Also, according to the present invention, the sync processor can use both a digital interface and an analog interface without the need for a separate analog sync processor.

While the present invention has been particularly shown and described with reference to exemplary embodiments thereof, it will be understood by those of ordinary skill in the art that various changes in form and details may be made herein without departing from the spirit and scope of the present invention as defined by the following claims.

What is claimed is:

1. A sync processor of a flat panel display (FPD) device, comprising:
    a digital horizontal/vertical signal generator that generates a digital horizontal/vertical sync signal in response to a data enable signal;
    a first selector that selects the digital horizontal/vertical sync signal or a horizontal/vertical sync signal received from a digital video interface (DVI), in response to a first selection signal;
    a digital horizontal/vertical signal detector that detects a signal transmitted by the first selector and that generates a digital horizontal/vertical signal;
    a horizontal/vertical polarity determination unit that receives the horizontal/vertical sync signal, that counts a number of cycles of low duration of the horizontal/vertical sync signal and a number of cycles of high duration of the horizontal/vertical sync signal, and that generates a horizontal/vertical polarity signal in response; and
    a horizontal/vertical frequency determination unit that receives the digital horizontal/vertical signal, that counts a number of cycles of a clock signal occurring in low durations of the digital horizontal/vertical signal and a number of cycles of the clock signal occurring in high durations of the digital horizontal/vertical signal, and that generates a horizontal/vertical frequency signal in response.

2. The sync processor of claim 1, wherein the sync processor further comprises an analog horizontal/vertical signal detector that receives an analog vertical sync signal and an analog horizontal sync signal and that generates an analog horizontal/vertical signal.

3. The sync processor of claim 2, wherein the horizontal/vertical polarity determination unit counts the number of low durations of the analog horizontal/vertical signal and the number of high durations of the analog horizontal/vertical signal, and generates the horizontal/vertical polarity signal in response.

4. The sync processor of claim 3, wherein the horizontal/vertical polarity determination unit generates a horizontal/vertical polarity signal with a low or high polarity corresponding to the smaller one among the number of the low durations of the digital horizontal/vertical signal or the analog horizontal/vertical signal and the number of the high durations of the digital horizontal/vertical signal or the analog horizontal/vertical signal.

5. The sync processor of claim 3, wherein the sync processor further comprises a second selector that selects the digital horizontal/vertical signal or the analog horizontal/vertical signal in response to a second control signal and that transmits the selected signal to the horizontal/vertical frequency determination unit.

6. The sync processor of claim 5, wherein the horizontal/vertical frequency determination unit counts a number of low durations of the analog horizontal/vertical signal and a number of high durations of the analog horizontal/vertical signal and generates the counted value as the horizontal/vertical frequency signal.

7. The sync processor of claim 5, wherein the first and second selection signals are provided from a microprocessor that determines whether the analog horizontal/vertical sync signal or the horizontal/vertical sync signal received from the DVI exists.

8. A sync processor of a flat panel display (FPD) device, comprising:
   an analog horizontal/vertical signal detector that receives an analog vertical sync signal and an analog horizontal sync signal and generates an analog horizontal/vertical signal;
   a digital horizontal/vertical signal generator generating a digital horizontal/vertical sync signal in response to a data enable signal;
   a first selector that selects the digital horizontal/vertical sync signal or a horizontal/vertical sync signal received from a digital video interface (DVI), in response to a first selection signal;
   a digital horizontal/vertical signal detector that detects a signal received from the first selector and that generates a digital horizontal/vertical signal in response;
   a horizontal/vertical polarity determination unit that counts a number of low durations of the analog horizontal/vertical signal or the horizontal/vertical sync signal and a number of high durations of the analog horizontal/vertical signal or the horizontal/vertical sync signal, and that generates a horizontal/vertical polarity signal in response;
   a second selector selecting the digital horizontal/vertical signal or the analog horizontal/vertical signal in response to a second control signal and transmits the selected signal to the horizontal/vertical frequency determination unit; and
   a horizontal/vertical frequency determination unit that counts a number of cycles of the clock signal occurring in low and high durations of a signal transmitted by the second selector and that generates a horizontal/vertical frequency signal in response.

9. The sync processor of claim 8, wherein the first and second selection signals are provided by a microprocessor that determines whether the analog horizontal/vertical sync signal or the horizontal/vertical sync signal received from the DVI exists.

* * * * *